(12) United States Patent
Li et al.

(10) Patent No.: US 11,009,645 B2
(45) Date of Patent: May 18, 2021

(54) BACKLIGHT MODULE

(71) Applicant: Nano Precision Taiwan Limited, Hsinchu County (TW)

(72) Inventors: Ching-Hsiang Li, Hsinchu County (TW); Shu-Ping Yang, Hsinchu County (TW); Fang-Hsuan Su, Hsinchu County (TW)

(73) Assignee: Nano Precision Taiwan Limited, Hsinchu County (TW)

( * ) Notice: Subject to any disclaimer, the term of this patent is extended or adjusted under 35 U.S.C. 154(b) by 0 days.

(21) Appl. No.: 16/882,698

(22) Filed: May 25, 2020

(65) Prior Publication Data
US 2020/0379159 A1    Dec. 3, 2020

(30) Foreign Application Priority Data

May 29, 2019  (CN) .......................... 201910455238.6
Jun. 24, 2019  (TW) ............................... 108121955

(51) Int. Cl.
*F21V 8/00*  (2006.01)
*G02B 5/04*  (2006.01)

(52) U.S. Cl.
CPC ........... *G02B 6/0025* (2013.01); *G02B 5/045* (2013.01)

(58) Field of Classification Search
None
See application file for complete search history.

(56) References Cited

U.S. PATENT DOCUMENTS

| 6,454,452 | B1 | 9/2002 | Sasagawa et al. | |
| 2008/0247191 | A1* | 10/2008 | Hsu | G02B 3/005 |
| | | | | 362/612 |
| 2015/0226901 | A1* | 8/2015 | Lee | G02B 6/0036 |
| | | | | 362/607 |
| 2015/0268404 | A1* | 9/2015 | Chiu | G02B 6/0073 |
| | | | | 362/606 |
| 2019/0285949 | A1* | 9/2019 | Chen | G02F 1/133606 |

FOREIGN PATENT DOCUMENTS

| CN | 101457906 | 6/2009 |
| TW | M358989 | 6/2009 |
| TW | I321250 | 3/2010 |
| TW | M472210 | 2/2014 |
| TW | 201426104 | 7/2014 |

\* cited by examiner

*Primary Examiner* — Ashok Patel
(74) *Attorney, Agent, or Firm* — JCIPRNET

(57) ABSTRACT

A backlight module including a light guide plate, a light source, an optical film, a first prism sheet and a second prism sheet is provided. The light guide plate has a light incident surface and a light emitting surface. The light source is disposed on a side of the light incident surface. The optical film is overlapped with the light emitting surface and includes a substrate, a plurality of optical microstructures and a first diffusion structure layer. The optical microstructures are disposed on a light incident side of the substrate. An extending direction of the optical microstructures intersects with the light incident surface. The first diffusion structure layer is disposed on a light emitting side of the substrate and is overlapped with the optical microstructures. The first prism sheet and the second prism sheet are overlapped with the optical film and are positioned on the light emitting side.

10 Claims, 9 Drawing Sheets

BACKLIGHT MODULE

CROSS-REFERENCE TO RELATED APPLICATION

This application claims the priority benefit of China application serial no. 201910455238.6, filed on May 29, 2019, and Taiwan application serial no. 108121955, filed on Jun. 24, 2019. The entirety of each of the above-mentioned patent applications is hereby incorporated by reference herein and made a part of this specification.

BACKGROUND

Technical Field

The disclosure relates to an optical module, and more particularly to a backlight module.

Description of Related Art

Along with the widespread application of non-self-luminous displays such as liquid crystal display devices, the design of backlight modules needs to be adjusted for different scenarios. In order to improve the light energy utilization rate of light source, the backlight module equipped with Brightness Enhancement Film (BEF) has become one of the mainstreams in the market. In general, such backlight module is provided with a laminated structure of two brightness enhancement films (for example, two prism sheets having orthogonal extending directions), and can guide the light beam of the light guide plate emitted at a large angle to a specific viewing angle range covering the normal viewing angle, thereby improving the overall intensity of light emitted from the backlight module at the normal viewing angle. However, the backlight module configured with double brightness enhancement films has limitation in achieving slim design of the backlight module.

In order to further increase the light collecting efficiency of the backlight module and overcome the limitation in slim design, a type of light-collecting backlight module that adopts a reverse prism sheet to replace the two laminated brightness enhancement films is developed. This type of backlight module can further increase the total amount of light emitted at the normal viewing angle (which means having the light focusing characteristic with a smaller angular range). Additionally, since the number of stacked optical film layers carried by the light collecting backlight module is decreased, the overall thickness of the backlight module can be effectively reduced, which facilitates to achieve slim design of the backlight module. However, from another point of view, in use of the light-collecting backlight module, when there are small defects or tiny objects (such as dusts or shavings that are brought in during assembly) between the film layers of the backlight module, they are easily detected in the process of the optical inspection of the following quality control. In other words, the backlight module with excellent light collecting efficiency has poor concealing ability to prevent small defects, which results in a decrease in overall assembly yield rate. Therefore, how to balance the light collecting efficiency and concealing ability of the backlight module is one of the problems that manufacturers need to face when designing and developing the product.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a backlight module with high assembly yield rate and good light collecting efficiency.

Other objects and advantages of the disclosure can be further understood from the technical features disclosed in the disclosure.

To achieve one or a part or all of the above or other purposes, an embodiment of the disclosure provides a backlight module. The backlight module includes a light guide plate, a light source, an optical film, a first prism sheet and a second prism sheet. The light guide plate has a light emitting surface and a light incident surface connected to each other. The light source is disposed on one side of the light incident surface of the light guide plate. The optical film is overlapped with the light emitting surface of the light guide plate. The optical film includes a substrate, a plurality of optical microstructures, and a first diffusion structure layer. The substrate has a light incident side and a light emitting side opposite to each other, and the light incident side faces the light guide plate. The optical microstructures are disposed on the light incident side of the substrate, and the extending direction of the optical microstructure intersects with the light incident surface of the light guide plate. The first diffusion structure layer is disposed on the light emitting side of the substrate and overlaps the optical microstructures. The first prism sheet and the second prism sheet are overlapped with the optical film, and each of them has a plurality of prism structures. The first prism sheet and the second prism sheet are located on the light emitting side of the substrate, and the first prism sheet is located between the optical film and the second prism sheet. The extending direction of the prism structures of the first prism sheet intersects with the extending direction of the prism structures of the second prism sheet.

In an embodiment of the disclosure, the extending direction of the optical microstructures of the optical film of the backlight module is perpendicular to the light incident surface of the light guide plate.

In an embodiment of the disclosure, the optical microstructures of the optical film of the backlight module include a plurality of diffusion particles.

In an embodiment of the disclosure, the cross section of each of the optical microstructures of the optical film of the backlight module is a triangle, a circular arc or a polygon.

In an embodiment of the disclosure, an orthogonal projection of the extending path of the optical microstructures of the optical film of the backlight module on the light emitting surface of the light guide plate is in a wave shape or a polyline shape.

In an embodiment of the disclosure, the material of the first diffusion structure layer of the backlight module includes a plurality of diffusion particles.

In an embodiment of the disclosure, the surface of the first diffusion structure layer of the backlight module has a microstructure.

In an embodiment of the disclosure, the second prism sheet of the backlight module further has a second diffusion structure layer disposed on a side of the second prism sheet facing the first prism sheet.

In an embodiment of the disclosure, the prism structures of the second prism sheet of the backlight module include a plurality of diffusion particles.

In an embodiment of the disclosure, the refractive index of the prism structures of the first prism sheet and the second prism sheet of the backlight module is between 1.62 and 1.75.

Based on the above, in the backlight module of an embodiment of the disclosure, the optical film located between the prism sheet and the light guide plate has a plurality of optical microstructures disposed on one side of the light emitting surface of the light guide plate, and intersects with the light incident surface of the light guide plate through the extending direction of the optical microstructure thereof, which can increase the overall amount of light emitted by the backlight module at an angle close to the normal viewing angle (that is, the light collecting efficiency of the backlight module can be improved). On the other hand, by disposing a diffusion structure layer on one side of the optical film away from the optical microstructure, it is possible to enhance the concealing ability of the backlight module, thereby increasing the assembly yield rate of the backlight module. In other words, the process latitude of each of the components in the backlight module may also be increased.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
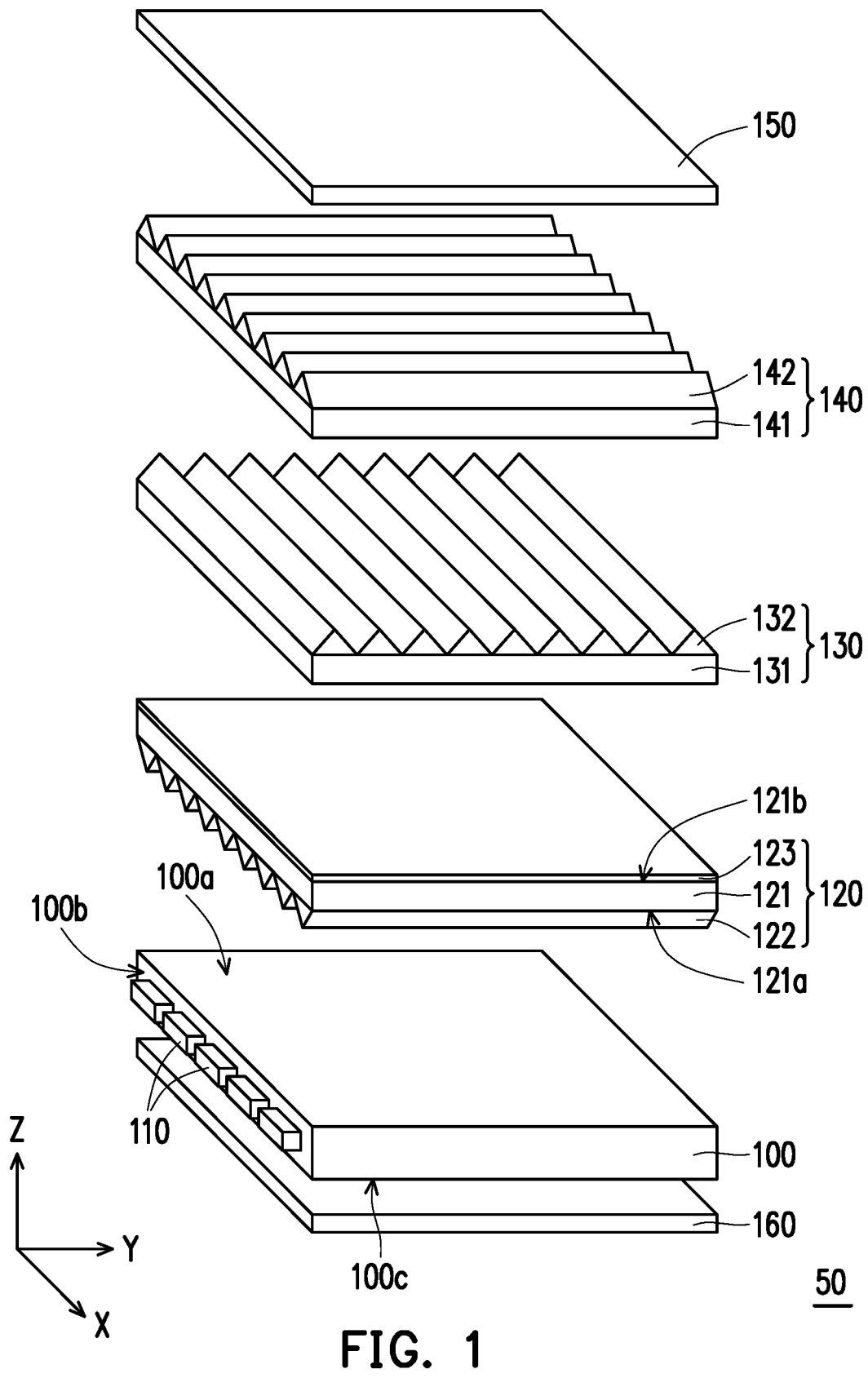
FIG. 1 is a schematic view of a backlight module of a first embodiment of the disclosure.
Figure 2:
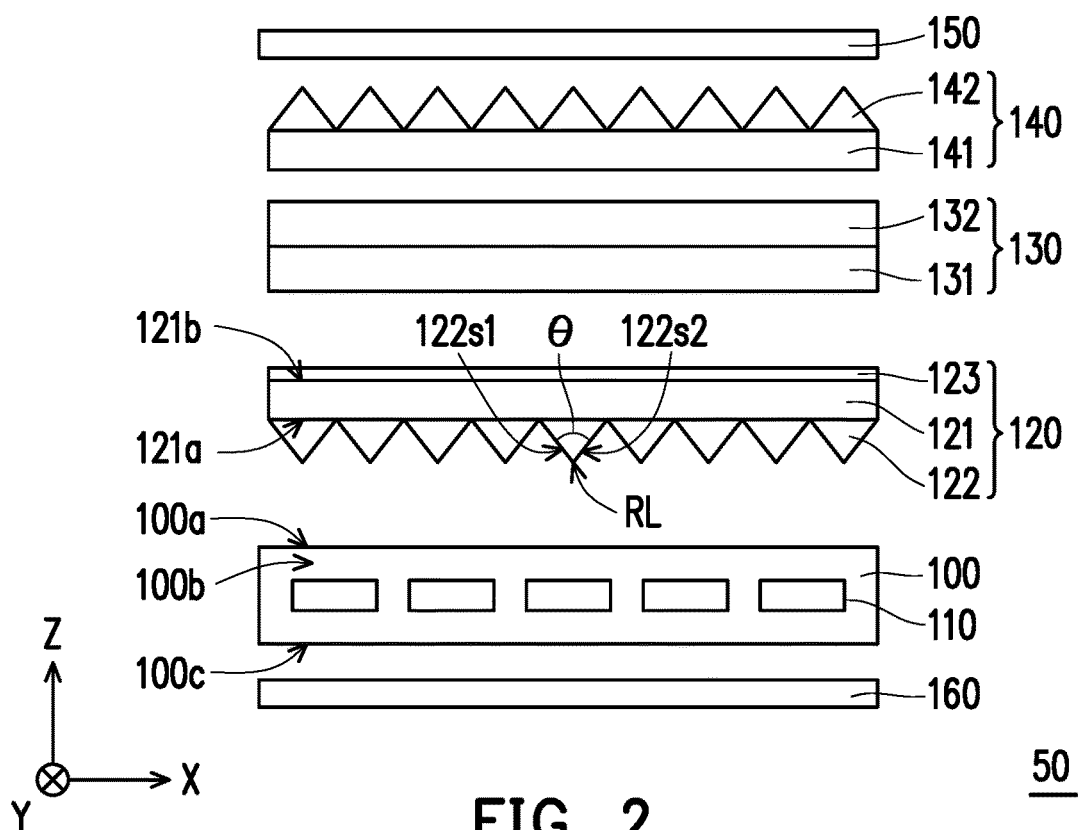
FIG. 2 is a schematic side view of the backlight module of FIG. 1.
Figure 3:
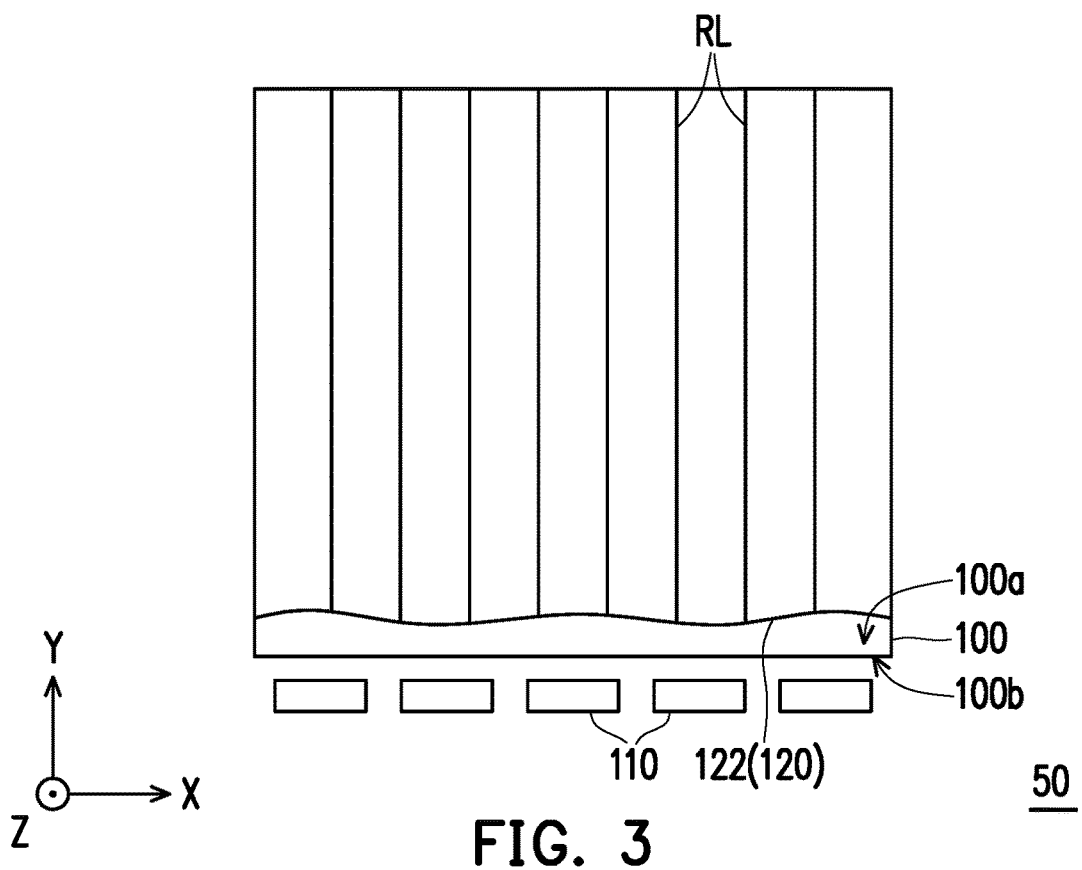
FIG. 3 is a schematic top view of the backlight module of FIG. 1.
Figure 4:
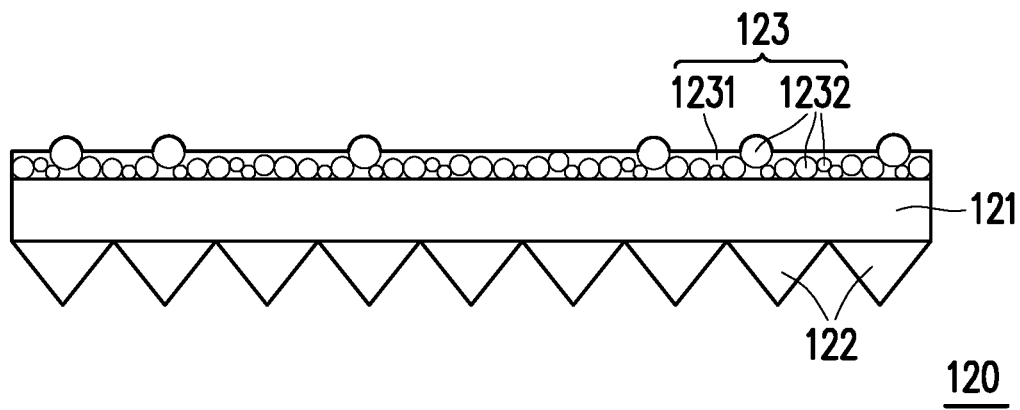
FIG. 4 is a schematic cross-sectional view of the optical film of FIG. 1.

FIG. 1 is a schematic view of a backlight module of a first embodiment of the disclosure. FIG. 2 is a schematic side view of the backlight module of FIG. 1. FIG. 3 is a schematic top view of the backlight module of FIG. 1. FIG. 4 is a schematic cross-sectional view of the optical film of FIG. 1. Specifically, FIG. 3 only illustrates a light guide plate 100, a light source 110, and an optical microstructure 122 of FIG. 2 for clarity of presentation.

Referring to FIG. 1 and FIG. 2, a backlight module 50 includes a light guide plate 100, a light source 110, and an optical film 120. The light guide plate 100 has a light emitting surface 100a and a light incident surface 100b, and the light emitting surface 100a is connected to the light incident surface 100b. The optical film 120 is overlapped with the light emitting surface 100a of the light guide plate 100. The light source 110 is disposed on one side of the light incident surface 100b of the light guide plate 100. That is, the backlight module 50 of the embodiment is an edge-type backlight module. However, the disclosure is not limited thereto. According to other embodiments, the backlight module may also be a direct backlit module. It should be noted that, in this embodiment, the number of the light source 110 is illustrated as five for exemplary purpose, which does not represent that the disclosure is limited by the disclosure of the drawings. In other embodiments, the number of the light source 110 in configuration can be adjusted according to the optical design of the backlight module.

Further, the optical film 120 includes a substrate 121, a plurality of optical microstructures 122 and a first diffusion structure layer 123. The substrate 121 has a light incident side 121a and a light emitting side 121b opposite to each other, wherein the light incident side 121a faces the light guide plate 100, and the optical microstructures 122 are disposed on the light incident side 121a of the substrate 121, wherein the extending direction of the optical microstructures 122 intersect with the light incident surface 100b of the light guide plate 100, and the optical microstructures 122 are selectively in contact with the light guide plate 100. In this embodiment, the material of the substrate 121 may include polyethylene terephthalate (PET) or polycarbonate (PC). The material of the optical microstructure 122 may include UV glue (ultraviolet curable resin, for example) or other suitable high molecular polymer.

In this embodiment, the optical microstructures 122 of the optical film 120 may be arranged in the direction X on the substrate 121 and extend in the direction Y. For example, the cross-sectional profile of the optical microstructure 122 on a plane (i.e., the XZ plane) perpendicular to the extending direction (i.e., direction Y) may be a triangle. That is, the optical microstructure 122 of the embodiment may be a triangular prism stripe, but the disclosure is not limited thereto. In other embodiments, the cross-sectional profile of the optical microstructure 122 on the XZ plane may also be adjusted according to actual light type requirements (or light splitting effects). More specifically, referring to FIG. 2, each of the optical microstructures 122 has a first inclined surface 122s1 and a second inclined surface 122s2 opposite to each other, and the junction of the first inclined surface 122s1 and the second inclined surface 122s2 defines a ridge line RL of the optical microstructure 122. In this embodiment, the optical microstructure 122 has an apex angle θ between the first inclined surface 122s1 and the second inclined surface 122s2, and the angular degree of the apex angle θ may be between 50 degrees and 90 degrees, but the disclosure is not limited thereto. In other embodiments, the angular degree of the apex angle θ of the optical microstructure may also be 90 degrees, between 90 degrees and 130 degrees, or between 30 degrees and 150 degrees.

Referring to FIG. 3, in the embodiment, the extending direction (i.e., the direction Y) of the orthogonal projection of the ridge line RL (i.e., the extending path) of the optical microstructure 122 on the light emitting surface 100a of the light guide plate 100 may be selectively perpendicular to the light incident surface 100b of the light guide plate 100. However, the disclosure is not limited thereto. According to other embodiments, the extending direction of the orthogonal projection of the ridge line RL of the optical microstructure 122 on the light guide plate 100 may not be perpendicular to the light incident surface 100b of the light guide plate 100. For example, the angle between the extending direction of the orthogonal projection of the ridge line RL of the optical microstructure 122 on the light guide plate 100 and the light incident surface 100b of the light guide plate 100 may be between 45 degrees and 90 degrees. In this manner, the total amount of light emitted by the backlight module at an angle close to the normal viewing angle can be increased.

Referring to FIG. 1 and FIG. 4, the first diffusion structure layer 123 of the optical film 120 is disposed on the light emitting side 121b of the substrate 121 and overlaps the plurality of optical microstructures 122 in the normal direction (i.e., the direction Z) of the light emitting surface 100a of the light guide plate 100. For example, the first diffusion structure layer 123 of the optical film 120 may selectively include a photosensitive adhesive layer 1231 and a plurality of diffusion particles 1232, wherein the diffusion particles 1232 are covered by the photosensitive adhesive layer 1231 (as shown in FIG. 4). In this embodiment, the material of the photosensitive adhesive layer 1231 is, for example, a UV glue (ultraviolet curable resin, for example) or other suitable transparent photosensitive adhesive material. The material of the diffusion particles 1232 may include polymethyl methacrylate (PMMA), polystyrene (PS), or a copolymer of the above materials. On the other hand, in the embodiment, the diffusion particles 1232 of the first diffusion structure layer 123 may be spherical and have various particle sizes, but the disclosure is not limited thereto. In other embodiments, the diffusion particles 1232 may also have substantially the same particle size.

It is worth mentioning that, by disposing the first diffusion structure layer 123 on the light emitting side 121b of the optical film 120, it is possible to make the optical film 120 to have a specific haze value. For example, the first diffusion structure layer 123 (or the optical film 120) may have a haze value between 20% and 90%. In this manner, the concealing ability of the backlight module can be improved, thereby improving the assembly yield rate of the backlight module. In other words, the process latitude of each component of the backlight module can also be enhanced. On the other hand, since the first diffusion structure layer 123 (or the optical film 120) has a specific haze value, the number of diffusers of the backlight module 50 can be further reduced, which contributes to reduce manufacturing cost.

Specifically, in the case where a specific requirement for concealing ability is to be met, in order to maximize the total amount of light emitted by the backlight module at an angle close to the normal viewing angle, the apex angle θ of the optical microstructure 122 may be adjusted according to the haze value of the first diffusion structure layer 123. For example, in an embodiment, the haze value of the first diffusion structure layer 123 is 20%, and the angular degree of the apex angle θ of the optical microstructure is 90 degrees; in another embodiment, the haze value of the first diffusion structure layer 123 is 50%, and in order to obtain the same degree of normal brightness, the angular degree of the apex angle θ of the optical microstructure needs to be designed to be less than 70 degrees.

Further, the backlight module 50 further includes a first prism sheet 130 and a second prism sheet 140. The first prism sheet 130 and the second prism sheet 140 are overlapped with the optical film 120 in the normal direction (i.e., the direction Z) of the light emitting surface 100a of the light guide plate 100, and are located on the light emitting side 121b of the substrate 121 of the optical film 120 (i.e., one side of the optical film 120 provided with the first diffusion structure layer 123). The first prism sheet 130 is located between the optical film 120 and the second prism sheet 140. Specifically, the first prism sheet 130 has a substrate 131 and a plurality of prism structures 132. The prism structures 132 are arranged in the direction Y on a side surface of the substrate 131 away from the optical film 120, and extend in the direction X. Similarly, the second prism sheet 140 has a substrate 141 and a plurality of prism structures 142. The prism structures 142 are arranged in the direction X on a side surface of the substrate 141 away from the first prism sheet 130, and extend in the direction Y.

In continuation to the above, in the embodiment, the extending direction (i.e., the direction X) of the prism structures 132 of the first prism sheet 130 may be perpendicular to the extending direction (i.e., direction Y) of the prism structures 142 of the second prism sheet 140 (projected onto the light emitting surface 100a, for example), but the disclosure is not limited thereto. In other embodiments, the extending direction of the prism structures 132 of the first prism sheet 130 may neither be perpendicular nor parallel to the extending direction of the prism structures 142 of the second prism sheet 140. That is, the angle between the extending direction of the prism structures 132 of the first prism sheet 130 and the extending direction of the prism structures 142 of the second prism sheet 140 may be greater than 0 degree and less than 90 degrees. In another embodiment, the extending direction of the prism structures 132 may be perpendicular to the extending direction of the prism structures 142, and the extending direction of the orthogonal projection of the ridge line RL of the optical microstructure 122 on the light guide plate 100 may be perpendicular to the extending direction of the prism structures 132, and an angle between the extending direction of the orthogonal projection of the ridge line RL of the optical microstructure 122 on the light guide plate 100 and the light incident surface 100b of the light guide plate 100 may be 90 degrees, between 45 degrees and 135 degrees, or any degrees. In this embodiment, a refractive index of the prism structures 132 of the first prism sheet 130 and the prism structures 142 of the second prism sheet 140 may be between 1.62 and 1.75. In this way, the total amount of light emitted by the backlight module 50 at an angle close to the normal viewing angle can be further improved.

Please further refer to FIG. 1, the backlight module 50 can also selectively include a diffuser 150, but the disclosure is not limited thereto. The diffuser 150 is overlapped with the second prism sheet 140, and is located on a side of the second prism sheet 140 away from the first prism sheet 130. Further, the backlight module 50 may further include a reflector 160. The light guide plate 100 further has a bottom surface 100c opposite to the light emitting surface 100a, and the reflector 160 is disposed on a side of the light guide plate 100 provided with the bottom surface 100c. Since a part of the light beam emitted by the light source 110 is emitted from the bottom surface 100c of the light guide plate 100 during the transmission through the light guide plate 100, which causes loss of light energy, through the arrangement of the reflector 160, the part of the light beam described above can be reflected and transmitted back to the light guide plate 100 to improve the utilization of light energy of the light source 110. However, the disclosure is not limited thereto. In other embodiments, the backlight module may not have the reflector 160.

Specifically, the backlight module (for example, the backlight module 50) in the embodiment of the disclosure is adapted for use with a non-self-luminous display panel, such as a liquid crystal display (LCD) panel or an electrophoretic display (EPD) panel for assembly into an electronic device (i.e., display apparatus) that can be used to display an image. That is to say, any display apparatus including a non-self-luminous display panel and adopting the backlight module in the embodiment of the disclosure still belongs to a technical solution applicable for the disclosure and does not deviate from the scope to be protected by the disclosure.

Figure 5:
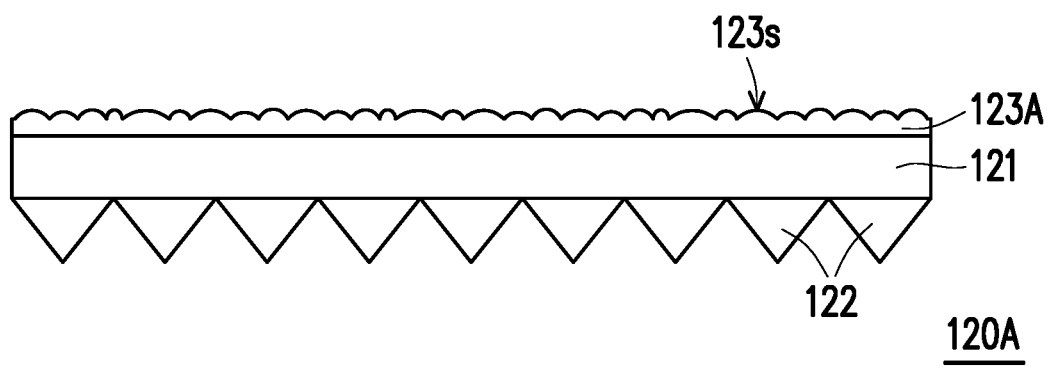
FIG. 5 to FIG. 8 are schematic cross-sectional views showing optical films according to other embodiments of the disclosure.

FIG. 5 to FIG. 8 are schematic cross-sectional views showing optical films according to other embodiments of the disclosure. Specifically, any of the optical films of FIG. 5-FIG. 8 can replace the optical film 120 of FIG. 1 to form a backlight module of different implementations. Referring to FIG. 5, the main difference between the optical film 120A of the embodiment and the optical film 120 of FIG. 4 lies in the composition and structure of the first diffusion structure layer. In the embodiment, the first diffusion structure layer 123A of the optical film 120A does not have diffusion particles, and a surface 123s of the first diffusion structure layer 123A away from the substrate 121 has a microstructure. It should be noted that the microstructure here is exemplarily illustrated as an irregular (or randomly distributed) concave-convex structure, which does not represent that the disclosure is limited by the disclosure of the drawings. In some embodiments, the microstructure of the first diffusion structure layer may also be a concave-convex structure having a periodic distribution, and the concave-convex structures may be fabricated (imprint, for example) by using a photolithography etching mold, or the photolithography and etching process may be performed directly on the first diffusion structure layer 123A to fabricate the concave-convex structure. That is, the material of the first diffusion structure layer 123A may include a UV glue (ultraviolet curable resin, for example) or a photoresist material. It is worth mentioning that the manufacturing method of the concave-convex structures is not limited to the above. In other embodiments, irregularities may be formed on the surface of the mold by performing sandblasting on the mold, and then UV forming is performed to form the first diffusion structure layer.

Figure 6:
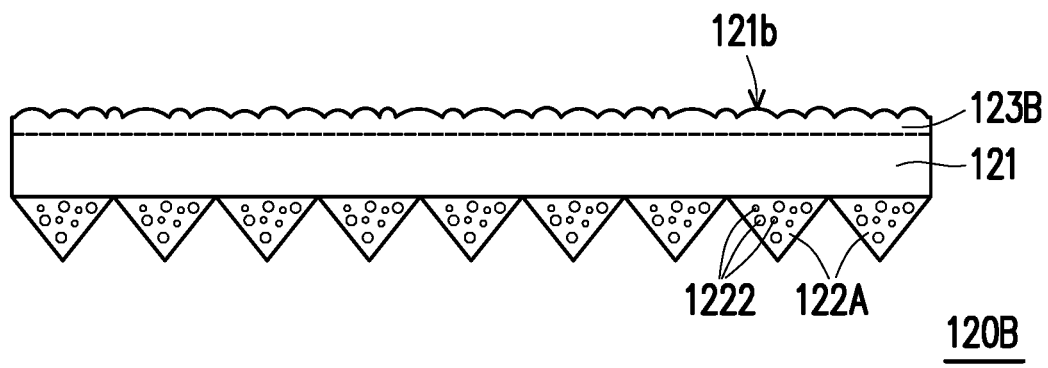

Referring to FIG. 6, the main difference between the optical film 120B of the embodiment and the optical film 120A of FIG. 5 lies in the composition of the optical microstructure and the first diffusion structure layer. In this embodiment, the optical microstructure 122A of the optical film 120B can include a plurality of diffusion particles 1222 (i.e., the optical microstructure 122A can also have a specific haze value). On the other hand, a mold (for example, a roller) having a randomly distributed concave-convex microstructures can be used to form concave-convex microstructures randomly distributed on the UV glue disposed on the light emitting side 121b of the substrate 121 and curing forming is performed to form the first diffusion structure layer 123B; or the method for forming the first diffusion structure layer 123B may include a step of roughening the surface by means of ultraviolet light or plasma on the surface at the light emitting side 121b of the substrate 121, that is, the first diffusion structure layer 123B and the substrate 121 may have the same material. For example, the haze value of the optical microstructure 122A may be less than the haze value of the first diffusion structure layer 123B. However, the disclosure is not limited thereto, and in other embodiments, the magnitude relationship between the haze value of the optical microstructure 122A and the haze value of the first diffusion structure layer 123B may also be set depending on the overall haze requirement of optical film 120B. In another embodiment, the first diffusion structure layer of the optical film may not have the microstructure, or the optical film does not have the first diffusion structure layer, that is, the haze required for the optical film is provided by the plurality of optical microstructures 122A including the diffusion particles 1222.

Figure 7:
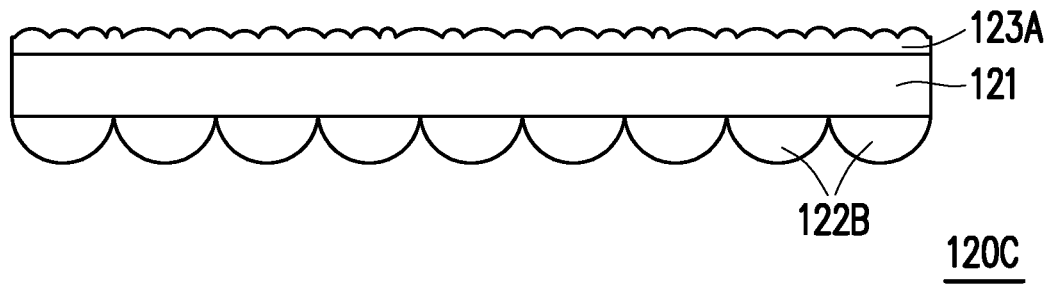
Figure 8:
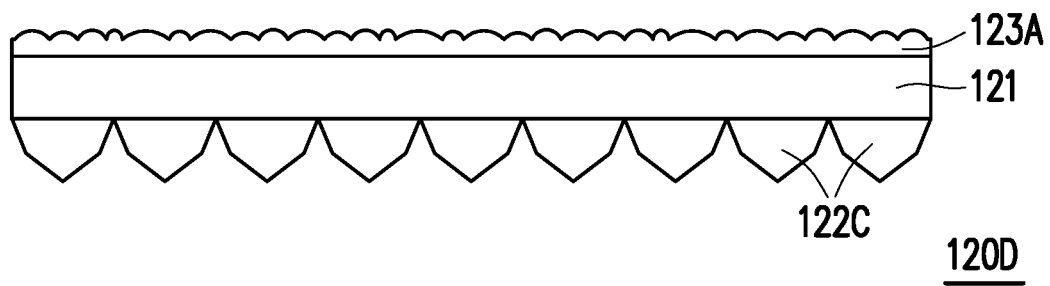

Referring to FIG. 7 and FIG. 8, the main difference between the optical film 120C of FIG. 7, the optical film 120D of FIG. 8, and the optical film 120A of FIG. 5 lies in the configuration of the optical microstructure. Specifically, the optical microstructure 122B of the optical film 120C has a circular cross-sectional profile, and the optical microstructure 122C of the optical film 120D has a polygonal cross-sectional profile (i.e., there are multiple polyline segments on the cross-sectional profile of the optical microstructure 122C). However, the disclosure is not limited to the above embodiments, and the implementation of the composition and structure of the different first diffusion structure layers as well as the composition and configuration of the optical microstructures and the like may be applied in combination according to the overall haze requirement of the optical film.

Figure 9A:
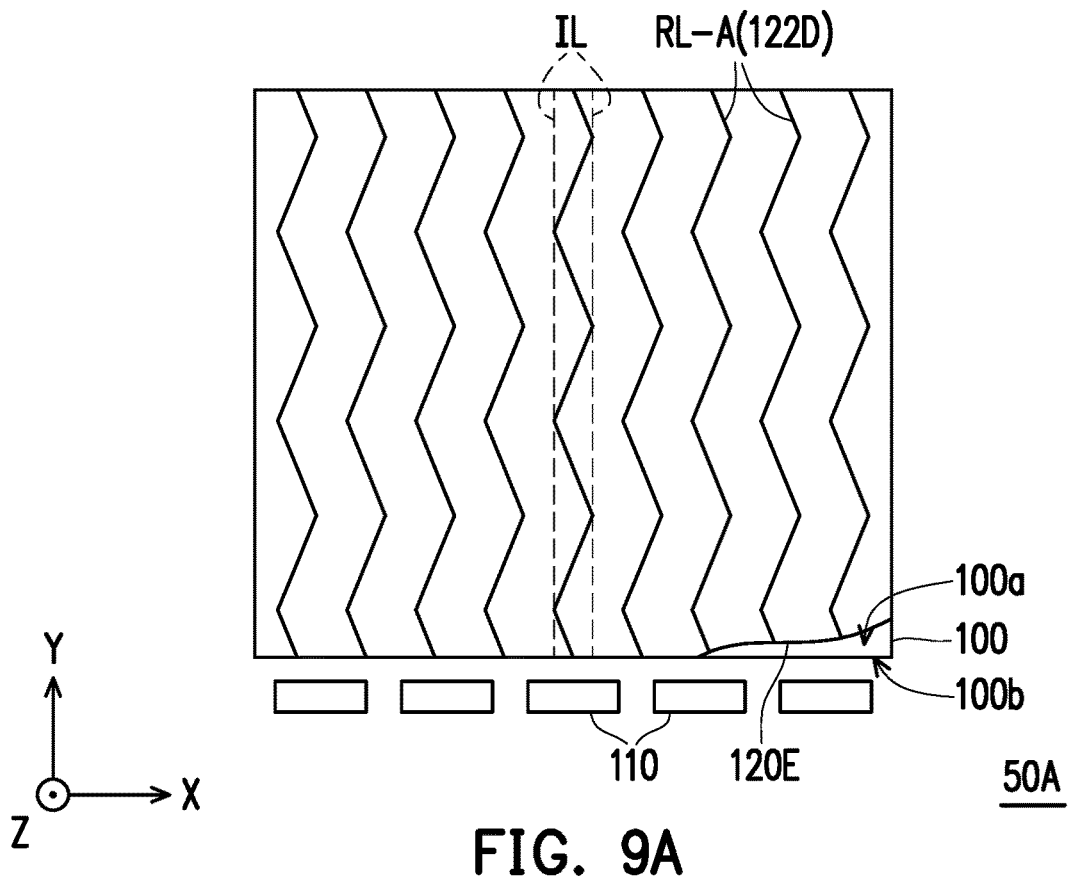
FIG. 9A is a schematic top view of a backlight module according to a second embodiment of the disclosure.
Figure 9B:
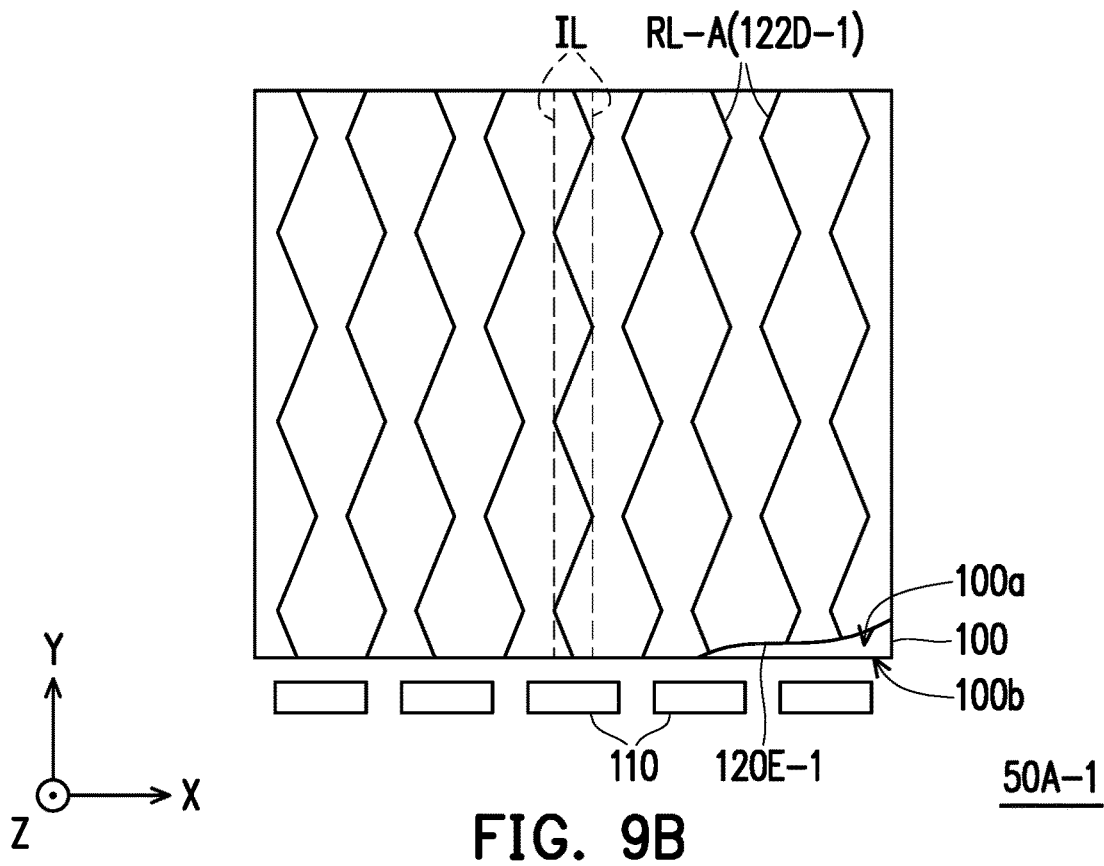
FIG. 9B is a schematic top view of a backlight module according to a third embodiment of the disclosure.

FIG. 9A is a schematic top view of a backlight module according to a second embodiment of the disclosure. FIG. 9B is a schematic top view of a backlight module according to a third embodiment of the disclosure. Referring to FIG. 9A, the difference between the backlight module 50A of the embodiment and the backlight module 50 of FIG. 3 lies in the configuration of the optical microstructure. In this embodiment, the orthogonal projection of the ridge line RL-A (i.e., the extending path) of the optical microstructure 122D of the optical film 120E on the light emitting surface 100a of the light guide plate 100 is a polyline shape. Specifically, although the extending path of the optical microstructure 122D is a polyline shape, the orthogonal projection of the ridge line RL-A thereof on the light guide plate 100 is confined between two virtual straight lines IL.

More specifically, the orthogonal projections of the plurality of bends of the ridge line RL-A of the optical microstructure 122D on the light guide plate 100 are respectively aligned with the two virtual straight lines IL, and the extending directions of the two virtual straight lines IL are respectively perpendicular to the light incident surface 100b of the light guide plate 100. That is, although the extending path of the optical microstructure 122D is a polyline shape, its extending direction is substantially perpendicular to the light incident surface 100b (i.e., the direction Y) of the light guide plate 100. It is worth mentioning that through the design that the orthogonal projection of the optical microstructure 122D on the light emitting surface 100a of the light guide plate 100 has a shape that is bent back and forth, it is possible to effectively suppress mura (bright and dark fringe pattern, for example), that is, the moiré pattern generated between the optical film 120E and the two prism sheets (e.g., the first prism sheet 130 and the second prism sheet 140). In other words, the uniformity of light emission of the backlight module 50A can be improved.

Referring to FIG. 9B, the difference between the backlight module 50A-1 of the embodiment and the backlight module 50A of FIG. 9A lies in the configuration of the optical microstructure. In this embodiment, two orthogonal projections of any two adjacent ridge lines RL-A of the optical microstructure 122D-1 of the optical film 120E-1 on the light guide plate 100 are exhibited in a mirror manner. In this manner, the mura phenomenon generated between the optical film 120E-1 and the two prism sheets (for example, the first prism sheet 130 and the second prism sheet 140) can be further suppressed.

Figure 10A:
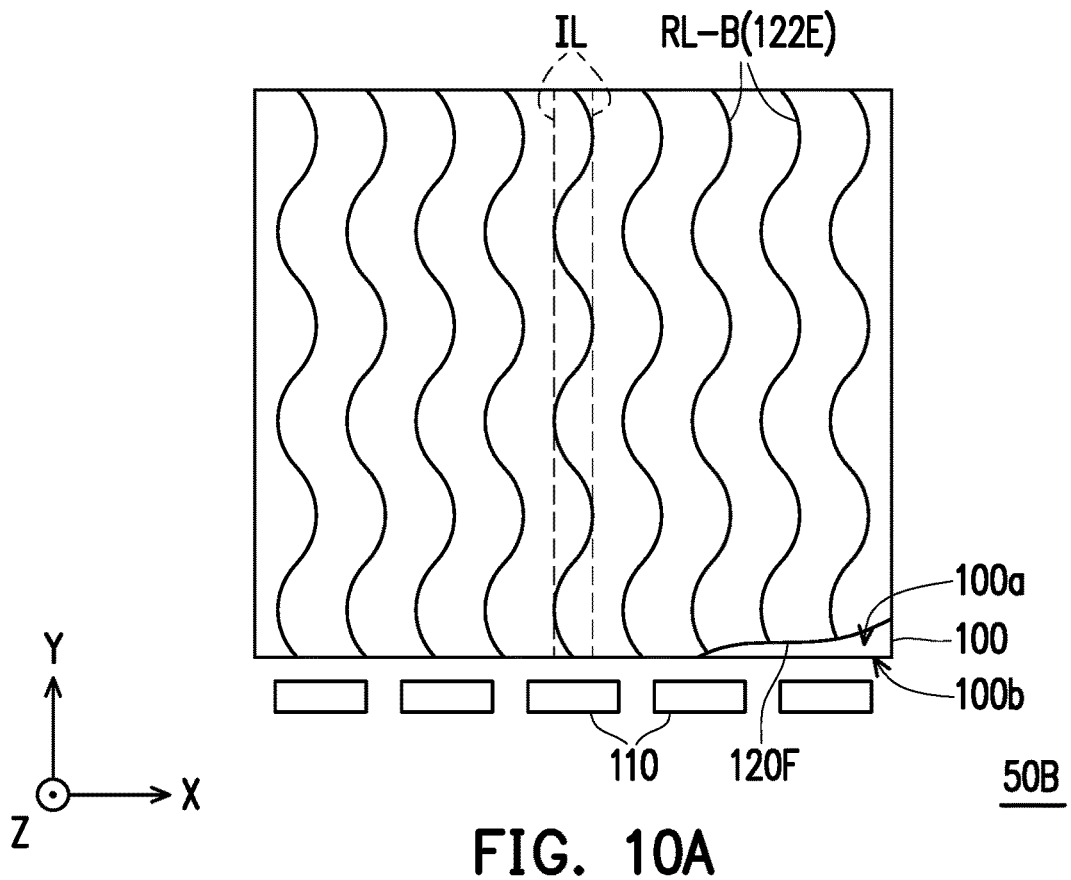
FIG. 10A is a schematic top view of a backlight module according to a fourth embodiment of the disclosure.
Figure 10B:
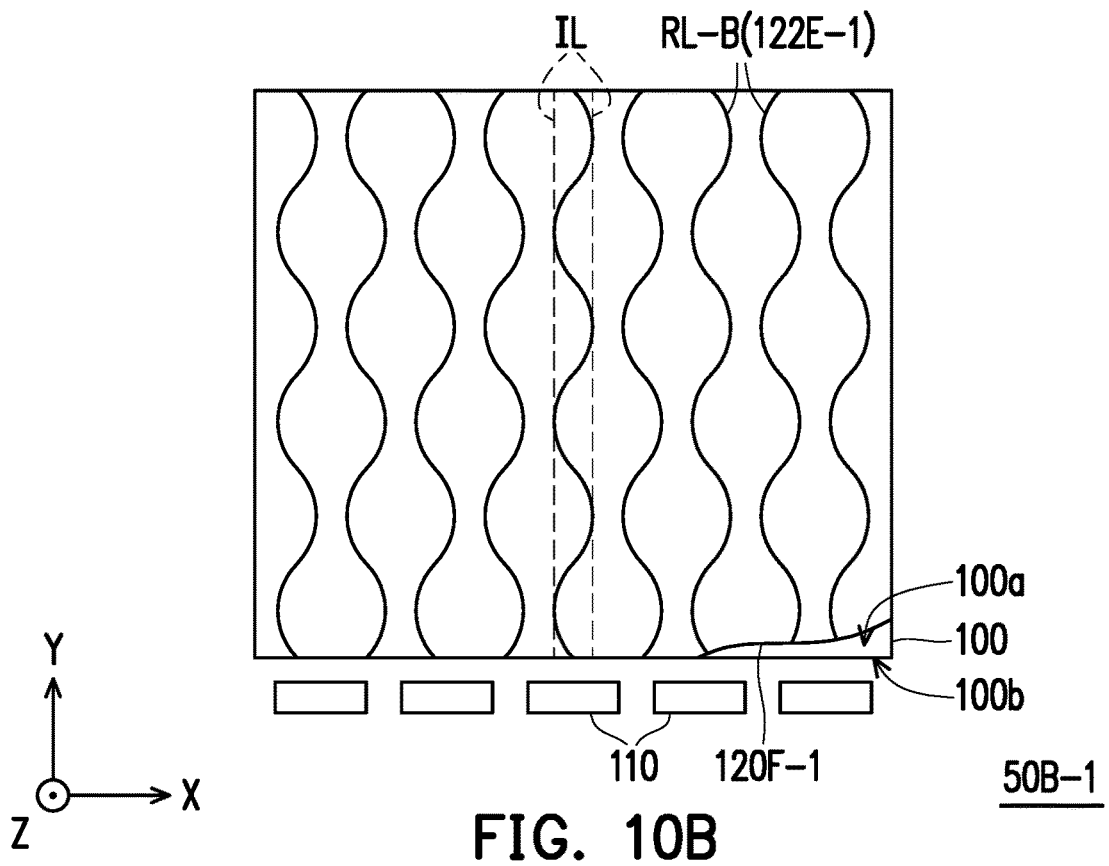
FIG. 10B is a schematic top view of a backlight module according to a fifth embodiment of the disclosure.

FIG. 10A is a schematic top view of a backlight module according to a fourth embodiment of the disclosure. FIG. 10B is a schematic top view of a backlight module according to a fifth embodiment of the disclosure. Referring to FIG. 10A, the difference between the backlight module 50B of the embodiment and the backlight module 50A of FIG. 9A lies in the configuration of the optical microstructure. In this embodiment, the orthogonal projection of the ridge line RL-B (i.e., the extending path) of the optical microstructure 122E of the optical film 120F on the light emitting surface 100a of the light guide plate 100 is a wave shape. Similar to the optical microstructure 122D of the foregoing embodiment (as shown in FIG. 9A), in the embodiment, although the extending path of the optical microstructure 122E is a wave shape (for example, a sine/cosine-like curve), its extending direction is substantially perpendicular to the light incident surface 100b (i.e., direction Y) of the light guide plate 100. However, the disclosure is not limited thereto, and according to other embodiments, the extending path of the optical microstructure may also be a non-periodic bending curve. It is worth mentioning that through the design that the orthogonal projection of the optical microstructure 122E on the light emitting surface 100a of the light guide plate 100 has a curved shape that is curved back and forth, it is possible to effectively suppress mura, that is, the moiré pattern generated between the optical film 120F and the two prism sheets (e.g., the first prism sheet 130 and the second prism sheet 140 shown in FIG. 1). In other words, the uniformity of light emission of the backlight module 50B can be improved.

For example, the method of forming the optical microstructure 122E of the optical film 120F can include applying an ultraviolet light curable adhesive layer (or other suitable resin layer) on the substrate 121 and utilizing a mold with a preset embossed pattern (e.g., wave pattern or polyline pattern) to imprint the ultraviolet light curable adhesive layer, while utilizing the ultraviolet light source to cure the ultraviolet light curable adhesive layer between the mold and the substrate 121. However, the disclosure is not limited thereto, and in other embodiments, the method of forming the optical microstructure may also include sculpting the above-mentioned ultraviolet light curable adhesive layer by using a cutting tool (milling cutter, for example) having a tip with a specific shape. Specifically, in the process of sculpting the ultraviolet light curable adhesive layer through the cutting tool, the cutting tool and the substrate 121 are moved relatively in the orthogonal direction (i.e., the direction X) of the traveling direction (i.e., the direction Y) of the cutting tool. In this manner, the formed optical microstructure has a wave distribution period in the extending direction thereof, which may be determined according to the period in which the cutting tool moves back and forth. In another embodiment, during the process of sculpting the ultraviolet light curable adhesive layer through the cutting tool, the cutting tool generates a back and forth movement in a direction perpendicular to the substrate (parallel with the normal direction of the substrate, for example), and a gourd-like wave accumulation configuration may be generated according to different degree of squeezing through the cutting tool as shown by the backlight module 50B-1 in FIG. 10B. That is, two orthogonal projections of any two adjacent ridge lines RL-B of the optical microstructure 122E-1 of the optical film 120E-1 on the light guide plate 100 are exhibited in a mirror manner. In this manner, the mura phenomenon generated between the optical film 120E-1 and the two prism sheets (for example, the first prism sheet 130 and the second prism sheet 140) can be further suppressed.

Figure 11:
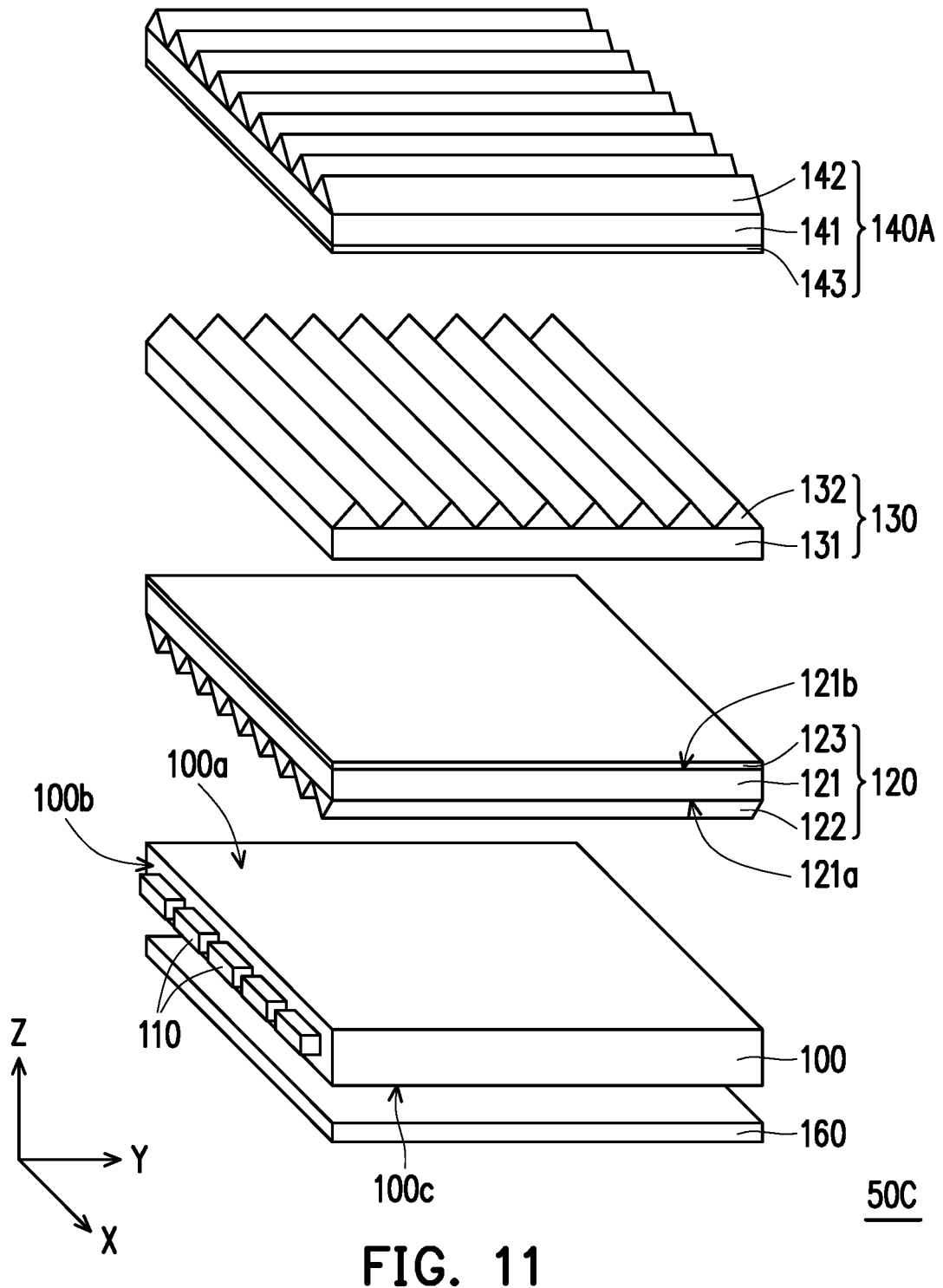
FIG. 11 is a schematic view of a backlight module according to a sixth embodiment of the disclosure.
Figure 12:
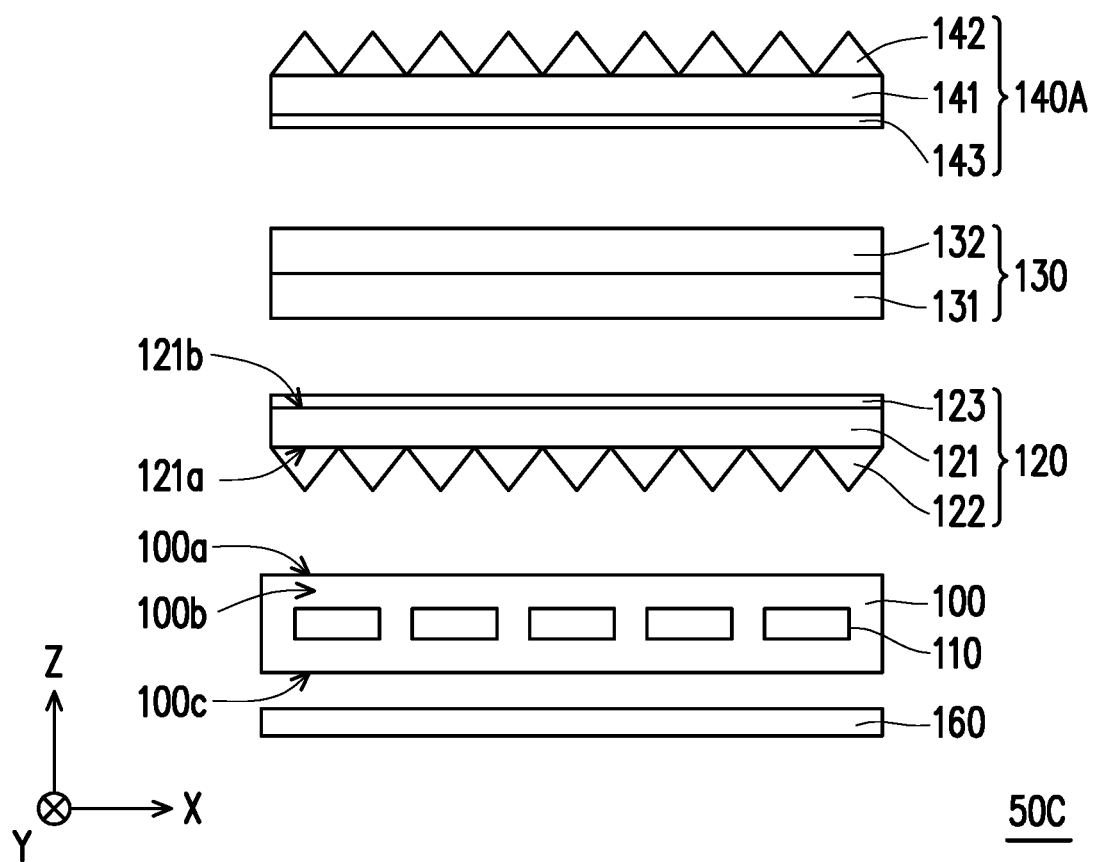
FIG. 12 is a schematic side view of the backlight module of FIG. 11.
Figure 13:
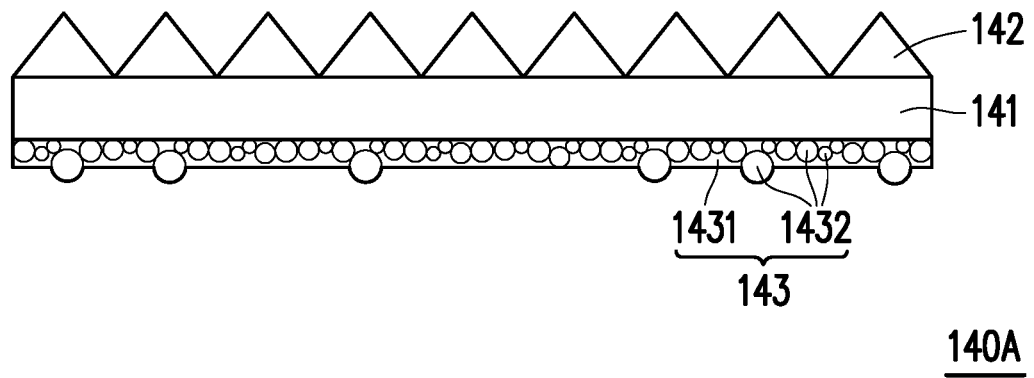
FIG. 13 is a schematic cross-sectional view of the second prism sheet of FIG. 11.

FIG. 11 is a schematic view of a backlight module according to a sixth embodiment of the disclosure. FIG. 12 is a schematic side view of the backlight module of FIG. 11. FIG. 13 is a schematic cross-sectional view of the second prism sheet of FIG. 11. Referring to FIG. 11 to FIG. 13, the difference between the backlight module 50C of the embodiment and the backlight module 50 of FIG. 1 lies in the configuration of the second prism sheet. In the embodiment, the second prism sheet 140A further has a second diffusion structure layer 143 disposed on a side of the second prism sheet 140A facing the first prism sheet 130, and overlapped with a plurality of prism structures 142 in the direction Z.

For example, referring to FIG. 13, the second diffusion structure layer 143 of the second prism sheet 140A may selectively include a photosensitive adhesive layer 1431 and a plurality of diffusion particles 1432, wherein the diffusion particles 1432 are covered by the photosensitive adhesive layer 1431 (as shown in FIG. 13). In this embodiment, the material of the photosensitive adhesive layer 1431 is, for example, UV glue, or other suitable transparent photosensitive adhesive material. The material of the diffusion particles 1432 may include polymethyl methacrylate (PMMA), polystyrene (PS), or a copolymer of the above materials. On the other hand, in the embodiment, the plurality of diffusion particles 1432 of the second diffusion structure layer 143 may be spherical and have various particle sizes, but the disclosure is not limited thereto. In other embodiments, the plurality of diffusing particles 1432 may also have substantially the same particle size. On the other hand, since the second diffusion structure layer 143 (or the second prism sheet 140A) has a specific haze value, the backlight module 50C may not be provided with the diffuser 150 as shown in FIG. 1, which facilitates to reduce manufacturing costs. However, the implementation of the second diffusion structure layer of the disclosure is not limited to the above embodiment, and the second diffusion structure layer may be implemented without diffusion particles but with a microstructured surface.

Figure 14:
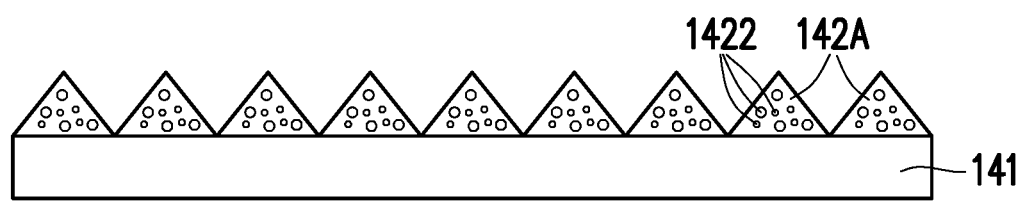
FIG. 14 is a schematic cross-sectional view showing a second prism sheet according to another embodiment of the disclosure.

FIG. 14 is a schematic cross-sectional view showing a second prism sheet according to another embodiment of the disclosure. Referring to FIG. 14, the main difference between the second prism sheet 140B of the embodiment and the second prism sheet 140A of FIG. 13 lies in the composition of the prism structure and the configuration of the second prism sheet. In this embodiment, the prism structure 142A of the second prism sheet 140B may include a plurality of diffusion particles 1422. That is, the prism structure 142A may have a specific haze value. On the other hand, one side of the second prism sheet 140B away from the prism structure 142A may not be provided with the second diffusion structure layer 143 (as shown in FIG. 13). That is, the desired haze of the second prims sheet 140B is provided by the plurality of prism structures 142A including the diffusion particles 1422. However, the implementation of the second prism sheet of the disclosure is not limited to the above embodiment, and the second prism sheet may also include a second diffusion structure layer having a microstructured surface and may be implemented with a composition of the prism structure having diffusion particles.

In summary, in the backlight module of an embodiment of the disclosure, the optical film located between the prism sheet and the light guide plate has a plurality of optical microstructures disposed on one side of the light emitting surface of the light guide plate, and intersects with the light incident surface of the light guide plate through the extending direction of the optical microstructure thereof, which can increase the overall amount of light emitted by the backlight module at an angle close to the normal viewing angle (that is, the light collecting efficiency of the backlight module can be improved). On the other hand, by disposing a diffusion structure layer on one side of the optical film away from the optical microstructure, it is possible to enhance the concealing ability of the backlight module, thereby increasing the assembly yield rate of the backlight module. In other words, the process latitude of each of the components in the backlight module may also be increased.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A backlight module, comprising:
   a light guide plate, having a light emitting surface and a light incident surface connected to each other;
   a light source, disposed on one side of the light incident surface of the light guide plate;
   an optical film, overlapped with the light emitting surface of the light guide plate, and the optical film comprising:
      a substrate, having a light incident side and a light emitting side opposite to each other, wherein the light incident side faces the light guide plate;
      a plurality of optical microstructures, disposed on the light incident side of the substrate, wherein an extending direction of the plurality of optical microstructures intersects with the light incident surface of the light guide plate; and
      a first diffusion structure layer, disposed on the light emitting side of the substrate and overlapping the plurality of optical microstructures; and
   a first prism sheet and a second prism sheet, overlapped with the optical film, and each has a plurality of prism structures, the first prism sheet and the second prism sheet are located on the light emitting side of the substrate, and the first prism sheet is located between the optical film and the second prism sheet, wherein an extending direction of the prism structures of the first prism sheet intersects with an extending direction of the prism structures of the second prism sheet.

2. The backlight module of claim 1, wherein an extending direction of the optical microstructures of the optical film is perpendicular to the light incident surface of the light guide plate.

3. The backlight module of claim 1, wherein the optical microstructures of the optical film comprise a plurality of diffusion particles.

4. The backlight module of claim 1, wherein a cross section of each of the optical microstructures of the optical film is a triangle, a circular arc or a polygon.

5. The backlight module of claim 1, wherein an orthogonal projection of an extending path of a ridge line of each of the optical microstructures of the optical film on the light emitting surface of the light guide plate is a wave shape or a polyline shape.

6. The backlight module of claim 1, wherein a material of the first diffusion structure layer comprises a plurality of diffusion particles.

7. The backlight module of claim 1, wherein a surface of the first diffusion structure layer has a microstructure.

8. The backlight module of claim 1, wherein the second prism sheet further has a second diffusion structure layer disposed on a side of the second prism sheet facing the first prism sheet.

9. The backlight module of claim 1, wherein the prism structures of the second prism sheet comprise a plurality of diffusion particles.

10. The backlight module of claim 1, wherein a refractive index of the prism structures of the first prism sheet and the second prism sheet is between 1.62 and 1.75.

* * * * *